Oct. 6, 1925.

F. E. WHITE

PIPE CONNECTION

Filed Aug. 2, 1924

1,556,058

Inventor:
Fred E. White
By Spear, Middleton, Donaldson, Hall
Attorneys.

Patented Oct. 6, 1925.

1,556,058

UNITED STATES PATENT OFFICE.

FRED E. WHITE, OF GARDNER, MASSACHUSETTS, ASSIGNOR TO FLORENCE STOVE COMPANY, OF GARDNER, MASSACHUSETTS, A CORPORATION OF MASSACHUSETTS.

PIPE CONNECTION.

Application filed August 2, 1924. Serial No. 729,828.

*To all whom it may concern:*

Be it known that I, FRED E. WHITE, a citizen of the United States, and resident of Gardner, in the county of Worcester and State of Massachusetts, have invented certain new and useful Improvements in Pipe Connections, of which the following is a specification.

My present invention relates to a pipe connection such as may be used in an oil stove.

The principal object of my invention is the provision of such a connection which may be readily made oil tight, which will be of simple construction, and which will be such that it will prevent sediment from flowing into the pipe from a supply tank.

To this end the invention includes a feed pipe penetrating a reservoir which is adapted to support the supply tank of such a stove. That part of the pipe penetrating the reservoir is threaded and projects above the reservoir. To this end is threaded a nut having a depending flange, said flange being spaced from the threaded end of the feed pipe. A flange washer, interiorly threaded at its flanged portion, is also threaded to the feed pipe and projects between the said pipe and the depending flange on the threaded nut. A gasket means is placed between the end of the flange on the nut and the reservoir, and upon tightening of the nut the gasket is deformed or jammed against the reservoir and the connection is made oil tight.

The invention further includes the details of construction and the combination and arrangement of parts shown and described.

I have illustrated in the accompanying drawings a preferred form of the invention, although it is to be understood that I do not wish to be limited thereto, as various changes will occur to those skilled in the art, and the form illustrated is simply a preferred embodiment.

In these drawings:—

Figure 1:
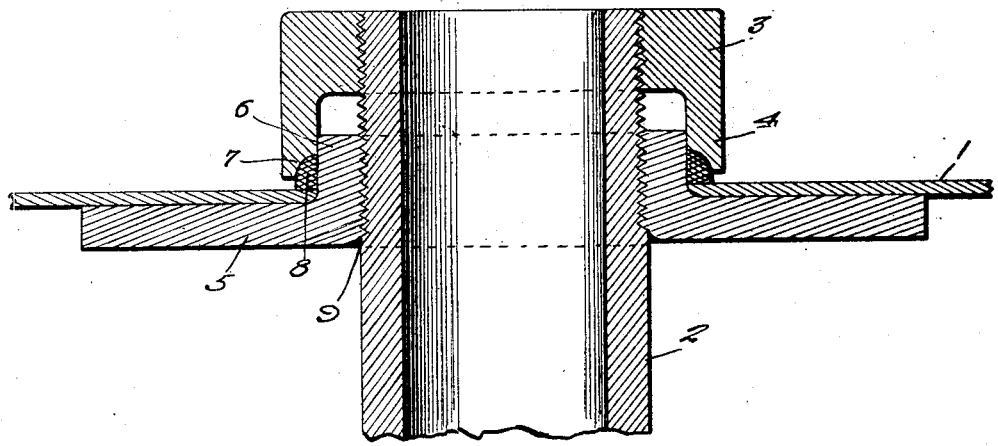
Figure 1 is a side elevation of a section showing one form of the invention.

Referring now with particularity to the invention as illustrated, I have shown at 1 the wall of the reservoir adapted to support the ordinary oil tank in a maintained oil level oil stove. Through an aperture in the reservoir 1 a feed or supply pipe 2 projects having its ends threaded and projecting above the level of the bottom of the reservoir 1. On this threaded end is placed a nut 3 having a depending flange 4 spaced from the threaded portion of the pipe 2, as indicated. Threaded to the pipe 2 and below the level of the reservoir 1, and abutting the same, is an annular washer 5 having a flange 6 thereon, said flange being threaded to the pipe 2. It will be noted that the depending flange 4 on the nut 3 has a cut away portion 7, and that a gasket element 8, of any desired material such as rubber, lead, graphited asbestos, or the like, is placed in such a position that when the nut 3 is screwed down, the gasket element 8 is pressed securely against a juncture of the parts 6, 3, 1 and 5, which effectively prevents leakage of the oil held in the reservoir 1.

It will be noted that the upper level of the pipe 2 and the top surface of the nut 3 are above the level of the reservoir 1. This is for the purpose of preventing sediment naturally occurring in the oil, or introduced accidentally afterwards, from finding its way from the reservoir into the feed pipe 2. Due to this construction such sediment remains in the bottom of the reservoir 1 and may be removed therefrom at intervals, as found necessary, only clear oil flowing over the top of the pipe 2 to the burners.

In some instances, it may be found desirable to place solder, or the like, as indicated at 9, to prevent leakage through the threads.

Figure 2:
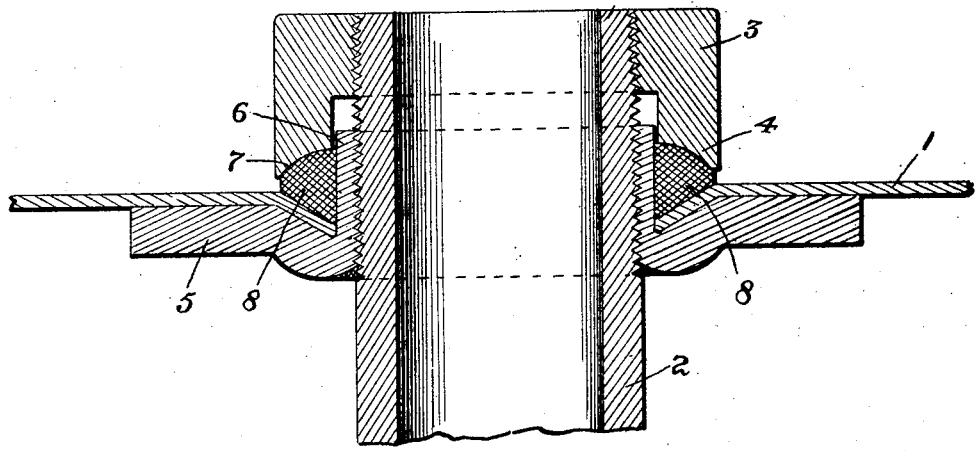
Fig. 2 is a like view of a modification.

In Fig. 2 is shown a slightly modified form of assembly, in which the part 5 is dished and the bottom of the oil reservoir depressed to enter this dished portion.

Having thus described my invention, what I claim is:—

In combination, a reservoir having a plane bottom, an aperture therein, a screw threaded cylindrical feed pipe extending into said aperture on each side of the plane bottom of the reservoir, a member threaded to said feed pipe and having a plane surface abutting the under side of the plane bottom of the reservoir, and a nut threaded to that part of the feed pipe above the plane bottom of the reservoir, said nut being cut away on its under side, and packing between said nut and said plane bottom of the reservoir and filling the cut away portion of the nut.

In testimony whereof, I affix my signature.

FRED E. WHITE.